(12) United States Patent
Patrick et al.

(10) Patent No.: US 6,914,027 B2
(45) Date of Patent: Jul. 5, 2005

(54) POLYMERIZATION REACTOR OPERABILITY USING STATIC CHARGE MODIFIER AGENTS

(75) Inventors: Brant Patrick, Seabrook, TX (US); Michael Elroy Muhle, Kingwood, TX (US); Matt Kuchta, Houston, TX (US)

(73) Assignee: Univation Technologies, LLC, Houston, TX (US)

(*) Notice: Subject to any disclaimer, the term of this patent is extended or adjusted under 35 U.S.C. 154(b) by 139 days.

(21) Appl. No.: 09/728,267

(22) Filed: Dec. 1, 2000

(65) Prior Publication Data

US 2002/0103072 A1 Aug. 1, 2002

(51) Int. Cl.$^7$ .......................... B01J 31/00; B01J 37/00; C08F 4/02; C08F 4/60
(52) U.S. Cl. ..................... 502/117; 502/150; 568/374; 568/454
(58) Field of Search ............................. 502/117, 150, 502/102, 155, 164, 167, 202, 157; 568/374, 454

(56) References Cited

U.S. PATENT DOCUMENTS

| | | | |
|---|---|---|---|
| 4,532,311 A | 7/1985 | Fulks et al. ............. 526/62 |
| 4,803,251 A | 2/1989 | Goode et al. ............ 526/59 |
| 5,304,615 A * | 4/1994 | Ambler et al. ........... 526/189 |
| 5,391,657 A | 2/1995 | Song et al. ............. 526/74 |
| 5,405,922 A | 4/1995 | DeChellis et al. ........ 526/68 |
| 5,436,304 A | 7/1995 | Griffin et al. ........... 526/68 |
| 5,550,304 A * | 8/1996 | Chauvin et al. .......... 585/512 |
| 5,595,950 A | 1/1997 | Sagar et al. |
| 5,629,253 A | 5/1997 | Chang .................. 502/111 |
| 5,675,051 A * | 10/1997 | Chauvin et al. .......... 585/646 |
| 5,824,832 A * | 10/1998 | Sherif et al. ........... 585/455 |
| 5,863,853 A | 1/1999 | Vaughan et al. .......... 502/108 |
| 5,892,124 A * | 4/1999 | Olivier et al. .......... 568/324 |
| 5,994,602 A * | 11/1999 | Abdul-Sada et al. ...... 585/457 |
| 6,025,529 A * | 2/2000 | Bahrmann ............... 568/454 |
| 6,087,291 A | 7/2000 | Speca et al. ............ 502/104 |
| 6,100,214 A | 8/2000 | Walzer, Jr. et al. ...... 502/159 |
| 6,512,019 B1 * | 1/2003 | Agarwal et al. ......... 521/134 |
| 6,524,988 B2 * | 2/2003 | Speca .................. 502/152 |

FOREIGN PATENT DOCUMENTS

WO    WO 01/81436 A1 * 11/2001    ......... C08F/10/00

OTHER PUBLICATIONS

Gassman, et al. Organometallics (1995) vol. 14, pp. 4879–4885.*

* cited by examiner

Primary Examiner—J. A. Lorengo
Assistant Examiner—Jennine Brown
(74) Attorney, Agent, or Firm—Jaimes Sher (57) ABSTRACT

The present invention relates to a catalyst composition and a method for making the catalyst composition of a polymerization catalyst and a static charge modifier. The invention is also directed to the use of the catalyst composition in the polymerization of olefin(s). In particular, the polymerization catalyst system is supported on a carrier. More particularly, the polymerization catalyst comprises a bulky ligand metallocene-type catalyst system.

10 Claims, 1 Drawing Sheet

Catalyst Static Profile

Catalyst Static Profile

Figure 1

Entrainment Static Profile

POLYMERIZATION REACTOR OPERABILITY USING STATIC CHARGE MODIFIER AGENTS

BACKGROUND OF THE INVENTION

1. Field of the Invention

It is desirable in many olefin polymerization processes, particularly a slurry phase or gas phase process, to use a supported catalyst system. A particularly useful catalyst system typically includes a metallocene and an alumoxane supported on a carrier, such as silica. For example, U.S. Pat. No. 4,937,217 generally describes a mixture of trimethylaluminum and triethylaluminum added to an undehydrated silica to which a metallocene catalyst component is then added. EP 308177 B1 generally describes adding a wet monomer to a reactor containing a metallocene, trialkylaluminum and undehydrated silica. U.S. Pat. Nos. 4,912,075, 4,935,397 and 4,937,301 generally relate to adding trimethylaluminum to an undehydrated silica and then adding a metallocene to form a dry supported catalyst system. U.S. Pat. No. 4,914,253 describes adding trimethylaluminum to undehydrated silica, adding a metallocene and then drying the resulting supported catalyst system with an amount of hydrogen to produce a polyethylene wax. U.S. Pat. Nos. 5,008,228, 5,086,025 and 5,147,949 generally describe forming a dry supported catalyst system by the addition of trimethylaluminum to a water impregnated silica to form alumoxane in situ and then adding the metallocene. U.S. Pat. Nos. 4,808,561, 4,897,455 and 4,701,432 describe techniques to form a supported catalyst where the inert carrier, typically silica, is calcined and contacted with a metallocene (s) and an activator/cocatalyst component. U.S. Pat. No. 5,238,892 describes forming a dry supported catalyst system by mixing a metallocene with an alkyl aluminum and then adding undehydrated silica. U.S. Pat. No. 5,240,894 generally pertains to forming a supported metallocene/alumoxane catalyst system by forming a metallocene/alumoxane reaction solution, adding a porous carrier, and evaporating the resulting slurry to remove residual solvent from the carrier.

While all these supported catalysts are useful, it would be desirable to have an improved metallocene catalyst system which in producing polymers does not foul the reactor. Particularly in a slurry or gas phase polymerization processes using these catalyst systems, there is a tendency for reactor operation problems during polymerization. During a typical polymerization process, fines within the reactor often accumulate and cling or stick to the walls of a reactor. This is the first stage of a phenomenon that is often referred to as "sheeting." After a relatively short period of time during polymerization, sheets formed from the aggregation of the fines begin to appear in the reactor, and these sheets plug product discharge systems forcing shutdown of the reactor. The sheets so formed may vary widely in size, but are similar in many characteristics. They consist of fused polymer which is oriented in the long direction of the sheets and their surfaces have a granular resin which has fused to the core. They are essentially strands of fused polymer.

The accumulation of polymer particles on the reactor surfaces and walls of the recycling lines, distributor plate if employed, and cooling system results in many problems. Of particular importance is the problem of poor heat transfer during the polymerization process. Polymer particles that adhere to the walls of the reactor can continue to polymerize and often fuse together, forming growing aggregate masses, which can be detrimental to a continuous and batch polymerization processes when they become sufficiently large. These aggregate masses trap heat along the reactor wall by their retardation of the normal convective forces that dissipate heat in the reactor.

It would be highly desirable to have an improved polymerization catalyst system that in a polymerization process would significantly enhance reactor operability and provide an improved polymer product.

2. Description of Related Art

The prior art contains a number of different teachings regarding minimization of fouling and sheeting in commercial scale, continuous olefin polymerization processes. The problem was recognized, along with attempts to resolve it before the widespread, commercial-scale use of metallocene-based catalysts in the late 1980s to early 1990s.

U.S. Pat. No. 4,532,211 used chromium-based metallocenes to treat the reactor bed medium prior to polymerization to prevent charge build-up. In this way, the '211 patent taught the prevention of polymer aggregate formation on the reactor wall and prevention of the subsequent development of "hot spots" at this site and ultimately, sheet formation. Notably, the '211 patent used traditional Zieglar-Natta catalysts such a TiCl4 with MgC12 as the active catalyst. The chromium-based metallocene was present only for its ability to maintain static voltage below those levels that would otherwise result in sheet formation.

For use in similar titanium or vanadium-based catalytic systems, U.S. Pat. No. 4,803,251, to Union Carbide Corporation, disclosed the use of a different group of chemical additives to control the level of static charge accumulation in the reactor. In the '251 case, additives such as alcohols containing up to seven carbon atoms, oxygen and nitric oxide were used in the case of negative electrostatic charge build-up. For positive electrostatic charge build-up, ketones of up to seven carbon atoms were taught. The additives were used at low levels to prevent poisoning of the catalyst; typically ranging from about 0.1 to 25 ppm based on monomer feed. U.S. Pat. No. 5,391,657 also to Union Carbide, expanded on the disclosure of U.S. '251 and used metal containing species as MgO, ZnO, A12O3, CuO and mixtures thereof for the control of positive charge accumulation, and species such as V2O5, SiO2, TiO2, Fe2O3 and mixtures thereof for the control of negative charge accumulation.

Later disclosures were directed toward addressing the problem in metallocene-based catalytic systems. Exxon U.S. Pat. No. 5,436,304 taught a remedy to the sheeting problem that was directed toward alleviating the problem of insufficient heat transfer caused by inadequate fluidization in the fluidized bed. It taught monitoring a condition of the reactor indicative of an onset of a failure condition and controlling the composition of a fluidizing medium or recycle stream in what is commonly known as condensed phase fluidized bed polymerization to correct problems in heat transfer. One way to achieve this was to modify the dew point of the recycle stream. '304 teaches the increase of operating pressure of the reaction/recycle stream and/or the increase in the percentage of condensable fluids and a decrease in the percentage of non-condensable gases in the recycle stream. Thus, the goal was not the prevention of the development of hot spots, but rather their removal or diminution upon evidence of their formation.

U.S. Pat. No. 5,405,922, assigned to Exxon Chemical Patents, teaches the application of remedial measures for sheeting to metallocene-based catalytic systems. Like the '304 patent, it is based upon modifying the dew point of the recycle stream In '922, this is accomplished by the use of non-polymerizable unsaturated hydrocarbons in the recycle stream.

Sheeting and fouling in metallocene-based systems was shown to be reducible in solid supported catalytic systems by the pretreatment via hydrolysis of alumoxane activators prior to their use. It appears that this serves to remove any unreacted alkyl aluminum species. U.S. Pat. No. 5,959,950 teaches that the resulting weight percent of "fines" produced in such cases is decreased, allowing for the realization of decreased fouling and sheeting. U.S. Pat. No. 5,629,253, also to Exxon, discloses a reduction in fouling and sheeting by adding an organometallic compound which is capable of forming alumoxane activators to a water-containing support material. By precisely controlling conditions, most notably temperature, a method is disclosed wherein the mole ratio of the metal of the organometallic compound to the water content of the support material is optimized in such a way as to minimize fouling and sheeting. Precise control of loading was also the essential teaching in U.S. Pat. No. 6,087,291. In contrast to the '253 patent in which the mole ratio of the metal of the organometallic compound to the water content was controlled, the '291 patent teaches a reduction in fouling and sheeting through the optimization of the molar ratio of the metal content of the alumoxane to the transition metal of the metallocene.

More recently, techniques for the reduction in fouling and sheeting in these polymerization processes was extended to catalytic systems utilizing noncoordinating anions (NCA) as activators of metallocenes. U.S. Pat. No. 6,100,214 teaches the use of a amino-modified polymer solid phase that is used to form an association with an NCA and an organometallic transition metal compound, typically metallocene. U.S. Pat. No. 5,863,853 is quite similar, although it teaches the use of porous solid supports into which the catalyst system components are loaded. Like the '291 patent discussed above, precise control of loading was taught, but the optimized parameter was the volume of metallocene and activator solution relative to the pore volume of the porous support.

Sheeting can be a substantial problem in commercial gas phase fluidized bed operation. Although a lot of progress has been made in the manufacture and use of supported metallocene catalysts, there remain important improvements to catalyst operability that might enable:

1. higher reactor utilization.
2. Access to grades that cannot presently be made; and
3. More reliable reactor transitions, e.g. from metallocene to Ziegler-Natta and back.

SUMMARY OF THE INVENTION

As discussed above, the use of chemical static charge modifiers is well known in the art. Unfortunately, most of the known static charge modifiers are ineffective when used with bulky ligand metallocene-type catalyst systems. In fact, some of the static charge modifiers described in the prior art are poisons for bulky ligand metallocene-type catalyst systems.

The present invention provides a catalyst system which incorporates a static charge modifier which is effective in inducing the static charge that develops in the catalyst system and does not substantially interfere with catalyst activity.

The invention relates to an improved bulky ligand metallocene-type catalyst system which, when used in a fluidized bed reactor, exhibits reduced static charges and thereby reduced sheeting. The improved catalyst system comprises a bulky ligand metallocene-type catalyst compound; an activator for the bulky metallocene-type catalyst compound; and a static charge modifier, wherein said static charge modifier having the general formula [C]+[A]− where [C]+ is a cation that does not possess an active hydrogen or other reactive group and [A]− is a weakly coordinating anion. The catalyst system of the present invention may further comprise an inert support or carrier.

The invention also comprises a method for polymerizing one or more olefins using the improved bulky ligand metallocene-type catalyst system.

Finally, the invention relates to a method of controlling static charges in a fluidized bed reactor using bulky ligand metallocene-type catalyst systems by introducing an effective amount of a static charge modifier into the reactor bed. The static charge modifier comprises a salt having the formula [C]+[A]− as defined above.

In particular, it is shown that addition of a tetraalkylammonium fluorinated borate salts, (e.g. [NR4][B(C6F5)4]) to the catalyst system improves the condition of static charge build-up and sheeting. It is believed that the use of the borate salts reduces static attraction of resin and/or catalyst to the walls of the reactor.

DETAILED DESCRIPTION OF THE INVENTION

The static charge modifiers of the present invention make use of the fact that inert charge carriers can be useful in diffusing charges in electrochemical systems. It has been observed that tetraalkylammonium borates can be used to improve the charge development of bulky ligand metallocene catalyst-type catalyst systems through this system. Of the salts that exhibit similar characteristics such as a large charge to mass ratio, solubility in organic solvents, a lack of any proton donor or acceptor are useful as static charge modifiers of the present invention.

The static charge modifiers of the present invention have the general formula [C]+[A]− wherein [C]+ is a cation that does not possess an active hydrogen or other reactive group and [A]− is a weakly coordinating anion.

In one embodiment component [C]+ comprises a compound having the formula [DR1 . . . Rn] wherein n is a positive integer, where each R is the same or different and is aliphatic or aromatic hydrocarbyls having from 1 to 18 carbon atoms, and D is an atom having a permanent charge selected from group 15 of the Periodic Table and wherein n is such that the ability of D to form additional chemical bonds is exhausted. In the preferred embodiment D is either nitrogen or phosphorous with nitrogen most preferred.

The anion component [A]− is a compound with the general formula [R'1 . . . R'm] wherein E is a metal or metalloid and each R' is independently, hydride radicals, bridged or unbridged dialkylamido radicals, alkoxide and anyloxide radicals, hydrocarbyl and substituted hydrocarbyl radicals, and hydrocarbyl- and halohydrocarbyl-substituted organometalloid radicals and any one, but not more than one, R' may be a halide radical; and m is equal to the valence state of plus 1.

In an alternative embodiment [A]- is represented by the formula [B Ar1 Ar2 X3 X4] wherein B is boron in the valence state of 3+, Ar1 and Ar2 are the same or different aromatic or substituted aromatic hydrocarbon radicals and may be linked to each other trough a stable bridging and X3 and X4 are independently, halide radicals, with the proviso that only X3 and X4 will be a halide, hydrocarbyl radicals, substituted hydrocarbyl radicals, hydrocarbyl and halo hydrocarbyl substituted organic metalloid radicals, dialkylamido radicals and alkoxy and aryloxy radicals.

In general, Ar1 and Ar2 may, independently, be any aromatic or substituted-aromatic hydrocarbon radical. Suitable aromatic radicals include, but are not limited to, phenyl, naphthyl and anthracenyl radicals. Suitable substituents on useful substituted-aromatic hydrocarbon radicals include, but are not necessarily limited to, hydrocarbyl radicals, organometalloid radicals, alkoxy radicals, alkylamido radicals, fluoro and fluorohydrocarbyl radicals and the like such as those useful as X3 or X4. The substituent may be ortho, meta or para, relative to the carbon atom bonded to the boron atom. When either or both X3 and X4 are a hydrocarbyl radical, each may be the same or a different aromatic or substituted-aromatic radical as are Ar1 and Ar2, or the same may be a straight or branched alkyl, alkenyl or alkynyl radical, a cyclic hydrocarbon radical or an alkylsubstituted cyclic hydrocarbon radical. X3 and X4 may also, independently, be alkoxy or dialkylamido radicals, hydrocarbyl radicals and organometalloid radicals and the like. As indicated supra, Ar1 and Ar2 may be linked to each other. Similarly, either or both of Ar1 and Ar2 could be linked to either X3 or X4. Finally, X3 and X4 may also be linked to each other through a suitable bridging group.

It is therefore expected that the scope of this invention would include [NR4][B(C6F5)4] salts as well as [PR4]B (C6F5)4), [NR4][Al(C6F5)4] salts, and salts containing other fluorinated borate anions such as tetrakis (heptafluoronaphthyl) borate, wherein R can be alkyl, aryl, a mixture of these, or other suitable group). Any analogous salts in which bonding to the charge carrying atoms has been exhausted is useful in the present invention. The salts can be included in the preparation of the catalyst, added to the catalyst in a separate step, or perhaps given suitable solubility, added with diluent. Note that the above cations do not possess active protons nor are they Lewis acids. Non-limiting examples of salts of the present invention are:

[N(C5H 11)4][B(C6F5)4], [P(C4H9)4[B(C6F5)4], [N(C4H9)4][B(C6F5)4], [N(C18H37)4[B(C6F5)4], [P(C6H5)4][B(C6F5)4], and [N(C 18H37)2(CH3)2][B (C6F5)4].

Of the foregoing salts, [N(C 18H37)4[B(C6F5)4] is most preferred.

Bulky Ligand Metallocene-Type Catalyst Compounds

Generally, bulky ligand metallocene-type catalyst compounds include half and full sandwich compounds having one or more bulky ligands including cyclopentadienyl-type structures or other similar functioning structure such as pentadiene, cyclooctatetraendiyl and imides. Typical bulky ligand metallocene-type compounds are generally described as containing one or more ligands capable of η-5 bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements. Exemplary of these bulky ligand metallocene-type catalyst compounds and catalyst systems are described in for example, U.S. Pat. Nos. 4,530,914, 4,871,705, 4,937, 299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664 all of which are herein fully incorporated by reference. Also, the disclosures of European publications EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 are all herein fully incorporated by reference for purposes of describing typical bulky ligand metallocene-type catalyst compounds and catalyst systems.

In one embodiment, bulky ligand metallocene-type catalyst compounds of the invention are represented by the formula:

$$L^A L^B M Q$$ (I)

where M is a metal from the Periodic Table of the Elements and may be a Group 3 to 10 metal, preferably, a Group 4, 5 or 6 transition metal or a metal from the lanthanide or actinide series, more preferably M is a transition metal from Group 4, even more preferably zirconium, hafnium or titanium. LA and LB are bulky ligands that include cyclopentadienyl derived ligands or substituted cyclopentadienyl derived ligands or heteroatom substituted or heteroatom containing cyclopentadienyl derived ligands, or hydrocarbyl substituted cyclopentadienyl derived ligands, or moieties such as indenyl ligands, benzindenyl ligands, fluorenyl ligands, octahydrofluorenyl ligands, cyclooctatetraendiyl ligands, azenyl ligands and borabenzene ligands, and the like, including hydrogenated versions thereof. Also, LA and LB may be any other ligand structure capable of η-5 bonding to M, for example LA and LB may comprises one or more heteroatoms, for example, nitrogen, silicon, boron, germanium, and phosphorous, in combination with carbon atoms to form a cyclic structure, for example a heterocyclopentadienyl ancillary ligand. Further, each of LA and LB may also be other types of bulky ligands including but not limited to bulky amides, phosphides, alkoxides, aryloxides, imides, carbolides, borollides, porphyrins, phthalocyanines, corrins and other polyazomacrocycles. Each LA and LB may be the same or different type of bulky ligand that is η-bonded to M.

Each LA and LB may be substituted with a combination of substituent groups R. Non-limiting examples of substituent groups R include hydrogen or linear, branched, alkyl radicals or cyclic alkyl, alkenyl, alkynl or aryl radicals or combination thereof having from 1 to 30 carbon atoms or other substituents having up to 50 non-hydrogen atoms that can also be substituted. Non-limiting examples of alkyl substituents R include methyl, ethyl, propyl, butyl, pentyl, hexyl, cyclopentyl, cyclohexyl, benzyl or phenyl groups, halogens and the like, including all their isomers, for example tertiary butyl, iso-propyl, etc. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstituted boron radicals including dimethylboron for example; and disubstituted nitrogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, nitrogen, phosphorous, oxygen, tin, germanium and the like including olefins such as but not limited to olefinically unsaturated substituents including vinyl-terminated ligands, for example but-3-enyl, 2-vinyl, or hexene-1. Also, at least two R groups, preferably two adjacent R groups are joined to form a ring structure having from 4 to 30 atoms selected from carbon, nitrogen, oxygen, phosphorous, silicon, germanium, boron or a combination thereof. Also, an R group such as 1-butanyl may form a carbon sigma bond to the metal M.

Other ligands may be bonded to the transition metal, such as a leaving group Q. Q may be independently monoanionic labile ligands having a sigma-bond to M. Non-limiting examples of Q include weak bases such as amines, phosphines, ether, carboxylates, dienes, hydrocarbyl radicals having from 1 to 20 carbon atoms, hydrides or halogens and the like, and combinations thereof. Other examples of Q radicals include those substituents for R as described above and including cyclohexyl, heptyl, tolyl, trifluoromethyl, tetramethylene and pentamethylene, methylidene, methyoxy, ethyoxy, propoxy, phenoxy, bis(N-methylanilide), dimethylamide, dimethylphosphide radicals and the like.

In addition, bulky ligand metallocene-type catalyst compounds of the invention are those where LA and LB are bridged to each other by a bridging group, A. These bridged compounds are known as bridged, bulky ligand metallocene-type catalyst compounds. Non-limiting examples of bridging group A include bridging radicals of at least one Group 14 atom, such as but not limited to carbon, oxygen, nitrogen, silicon, germanium and tin, preferably carbon, silicon and germanium, most preferably silicon. Other non-limiting examples of bridging groups A include dimethylsilyl, diethylsilyl, methylethylsilyl, trifluoromethylbutylsilyl, bis(trifluoromethyl)silyl, di-n-butylsilyl, silylcyclobutyl, di-i-propylsilyl, di-cyclohexylsilyl, di-phenylsilyl, cyclohexylphenylsilyl, t-butylcyclohexylsilyl, di-t-butylphenylsilyl, di(p-tolyl)silyl, dimethylgermyl, diethylgermyl, methylene, dimethylmethylene, diphenylmethylene, ethylene, 1-2-dimethylethylene, 1,2-diphenylethylene, 1,1,2,2-tetramethylethylene, dimethylmethylenedimethylsilyl, methylenediphenylgermyl, methylamine, phenylamine, cyclohexylamine, methylphosphine, phenylphosphine, cyclohexylphosphine and the like.

In another embodiment, the bulky ligand metallocene-type catalyst compound of the invention is represented by the formula:

(C5H4-dRd)Ax(C5H4-dRd)MQg-2    (II)

wherein M is a Group 4, 5, 6 transition metal, (C5H4-dRd) is an unsubstituted or substituted cyclopentadienyl derived bulky ligand bonded to M, each R, which can be the same or different, is hydrogen or a substituent group containing up to 50 non-hydrogen atoms or substituted or unsubstituted hydrocarbyl having from 1 to 30 carbon atoms or combinations thereof, or two or more carbon atoms are joined together to form a part of a substituted or unsubstituted ring or ring system having 4 to 30 carbon atoms, A is one or more of, or a combination of carbon, germanium, silicon, tin, phosphorous or nitrogen atom containing radical bridging two (C5H4-dRd) rings; more particularly, non-limiting examples of A may be represented by R'2C, R'2Si, R'2Si R'2Si, R'2Si R'2C, R'2Ge, R'2Ge, R'2Si R'2Ge, R'2GeR2C, R'N, R'P, R'2C R'N, R'2C R'P, R'2Si R'N, R'2Si R'P, R'2GeRN, R'2Ge R'P, where R' is independently, a radical group which is hydride, C1-30 hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen; each Q which can be the same or different is a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof; also, two Q's together may form an alkylidene ligand or cyclometallated hydrocarbyl ligand or other divalent anionic chelating ligand, where g is an integer corresponding to the formal oxidation state of M, and d is an integer selected from the 0, 1, 2, 3 or 4 and denoting the degree of substitution and x is an integer from 0 to 1.

In one embodiment, the bulky ligand metallocene-type catalyst compounds are those where the R substituents on the bulky ligands LA, LB, (C5H4-dRd) of formulas (I) and (II) are substituted with the same or different number of substituents on each of the bulky ligands.

In a preferred embodiment, the bulky ligand metallocene-type catalyst is represented by formula (II), where x is 1.

Other bulky ligand metallocene-type catalysts compounds useful in the invention include bridged, mono-bulky ligand heteroatom containing metallocene-type compounds. These types of catalysts and catalyst systems are described in, for example, PCT publication WO 92/00333, W 94/07928, WO 91/04257, WO 94/03506, WO96/00244 and WO 97/15602 and U.S. Pat. Nos. 5,057,475, 5,096,867, 5,055,438, 5,198, 401, 5,227,440 and 5,264,405 and European publication EP-A-0 420 436, all of which are herein filly incorporated by reference. Other bulky ligand metallocene-type catalysts useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401 and 5,723,398 and PCT publications WO 93/08221, WO 93/08199, WO 95/07140, WO 98/11144 and European publications EP-A-0 578 838, EP-A-0 638 595, EP-B-0 513 380 and EP-A1-0 816 372, all of which are herein fully incorporated by reference.

In another embodiment of this invention the bridged, mono-bulky ligand heteroatom containing metallocene-type catalyst compounds useful in the invention are represented by the formula:

wherein M is Ti, Zr or Hf; (C5H5-y-xRx) is a cyclopentadienyl ring or ring system which is substituted with from 0 to 5 substituent groups R, "x" is 0, 1, 2, 3, 4 or 5 denoting the degree of substitution, and each substituent group R is, independently, a radical selected from a group consisting of C1–C20 hydrocarbyl radicals, substituted C1–C20 hydrocarbyl radicals wherein one or more hydrogen atoms is replaced by a halogen atom, C1–C20 hydrocarbyl-substituted metalloid radicals wherein the metalloid is selected from the Group 14 of the Periodic Table of Elements, and halogen radicals or (C5H5-y-xRx) is a cyclopentadienyl ring in which two adjacent R-groups are joined forming C4–C20 ring to give a saturated or unsaturated polycyclic cyclopentadienyl ligand such as indenyl, tetrahydroindenyl, fluorenyl or octahydrofluorenyl;

(JR'z-1-y) is a heteroatom ligand in which J is an element with a coordination number of three from Group 15 or an element with a coordination number of two from Group 16 of the Periodic Table of Elements, preferably nitrogen, phosphorus, oxygen or sulfur with nitrogen being preferred, and each R' is, independently a radical selected from a group consisting of C1–C20 hydrocarbyl radicals wherein one or more hydrogen atoms is replaced by a halogen atom, y is 0 or 1, and "z" is the coordination number of the element J;

each Q is, independently any univalent anionic ligand such as halogen, hydride, or substituted or unsubstituted C1–C30 hydrocarbyl, alkoxide, aryloxide, amide or phosphide, provided that two Q may be an alkylidene, a cyclometallated hydrocarbyl or any other divalent anionic chelating ligand; and n may be 0, 1 or 2;

A is a covalent bridging group containing a Group 15 or 14 element such as, but not limited to, a dialkyl, alkylaryl or diaryl silicon or germanium radical, alkyl or aryl phosphine or amine radical, or a hydrocarbyl radical such as methylene, ethylene and the like;

L' is a Lewis base such as diethylether, tetraethylammonium chloride, tetrahydrofuran, dimethylaniline, aniline, trimethylphosphine, n-butylamine, and the like; and w is a number from 0 to 3. Additionally, L' may be bonded to any of R, R' or Q and n is 0, 1, 2or 3.

In another embodiment, the bulky ligand type metallocene-type catalyst compound is a complex of a transition metal, a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference. Preferably, the bulky ligand type metallocene-type catalyst compound, the monocycloalkadienyl catalyst compound, may be represented by one of the following formulas:

wherein M is a transition metal from Group 4, 5 or 6, preferably titanium zirconium or hafnium, most preferably zirconium or hafnium; L is a substituted or unsubstituted, pi-bonded ligand coordinated to M, preferably L is a cycloalkadienyl bulky ligand, for example cyclopentadienyl, indenyl or fluorenyl bulky ligands, optionally with one or more hydrocarbyl substituent groups having from 1 to 20 carbon atoms; each Q is independently selected from the group consisting of —O—, —NR—, —CR2— and —S—, preferably oxygen; Y is either C or S, preferably carbon; Z is selected from the group consisting of —OR, —NR2, —CR3, —SR, —SiR3, —PR2, —H, and substituted or unsubstituted aryl groups, with the proviso that when Q is —NR— then Z is selected from the group consisting of —OR, —NR2, —SR, —SiR3, —PR2 and —H, preferably Z is selected from the group consisting of —OR, —CR3 and —NR2; n is 1 or 2, preferably 1; A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent; and T is a bridging group selected from the group consisting of alkylene and arylene groups containing from 1 to 10 carbon atoms optionally substituted with carbon or heteroatom(s), germanium, silicon and alkyl phosphine; and m is 2 to 7, preferably 2 to 6, most preferably 2 or 3.

In formulas (IV) and (V), the supportive substituent formed by Q, Y and Z is a unicharged polydentate ligand exerting electronic effects due to its high polarizability, similar to the cyclopentadienyl ligand. In the most preferred embodiments of this invention, the disubstituted carbamates and the carboxylates are employed. Non-limiting examples of these bulky ligand metallocene-type catalyst compounds include indenyl zirconium tris(diethylcarbamate), indenyl zirconium tris(trimethylacetate), indenyl zirconium tris(p-toluate), indenyl zirconium tris(benzoate), (1-methylindenyl)zirconium tris(trimethylacetate), (2-methylindenyl) zirconium tris(diethylcarbamate), (methylcyclopentadienyl) zirconium tris(trimethylacetate), cyclopentadienyl tris(trimethylacetate), tetrahydroindenyl zirconium tris(trimethylacetate), and (pentamethylcyclopentadienyl) zirconium tris(benzoate). Preferred examples are indenyl zirconium tris(diethylcarbamate), indenyl zirconium tris(trimethylacetate), and (methylcyclopentadienyl) zirconium tris(trimethylacetate).

In another embodiment of the invention the bulky ligand metallocene-type catalyst compounds are those nitrogen containing heterocyclic ligand complexes, also known as transition metal catalysts based on bidentate ligands containing pyridine or quinoline moieties, such as those described in WO 96/33202, WO 99/01481 and WO 98/42664 and U.S. Pat. No. 5,637,660, which are herein all incorporated by reference.

It is within the scope of this invention, in one embodiment, that bulky ligand metallocene-type catalyst compound complexes of Ni2+ and Pd2+ described in the articles Johnson, et al., "New Pd(II)- and Ni(II)- Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, which are all herein fully incorporated by reference, may be combined with a carboxylate metal salt for use in the process of invention. These complexes can be either dialkyl ether adducts, or alkylated reaction products of the described dihalide complexes that can be activated to a cationic state by the conventional-type cocatalysts or the activators of this invention described below.

Also included as bulky ligand metallocene-type catalyst compounds are those diimine based ligands for Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene-type catalysts are those Group 5 and 6 metal imido complexes described in EP-A2-0 816 384 and U.S. Pat. No. 5,851,945, which is incorporated herein by reference. In addition, bulky ligand metallocene-type catalysts include bridged bis(arylamido) Group 4 compounds described by D. H. McConville, et al., in Organometallics 1195, 14, 5478–5480, which is herein incorporated by reference. Other bulky ligand metallocene-type catalysts are described as bis(hydroxy aromatic nitrogen ligands) in U.S. Pat. No. 5,852,146, which is incorporated herein by reference. Other metallocene-type catalysts containing one or more Group 15 atoms include those described in WO 98/46651, which is herein incorporated herein by reference. Still another metallocene-type bulky ligand metallocene-type catalysts include those multinuclear bulky ligand metallocene-type catalysts as described in WO 99/20665, which is incorporated herein by reference.

It is contemplated in some embodiments, that the bulky ligands of the metallocene-type catalyst compounds of the invention described above may be asymmetrically substituted in terms of additional substituents or types of substituents, and/or unbalanced in terms of the number of additional substituents on the bulky ligands or the bulky ligands themselves are different.

It is also contemplated that in one embodiment, the bulky ligand metallocene-type catalysts of the invention include their structural or optical or enantiomeric isomers (meso and racemic isomers) and mixtures thereof. In another embodiment the bulky ligand metallocene-type compounds of the invention may be chiral and/or a bridged bulky ligand metallocene-type catalyst compound.

Activator and Activation Methods For the Bulky Ligand Metallocene-Type Catalyst Compounds The above described bulky ligand metallocene-type catalyst compounds of the invention are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the bulky ligand metallocene-type catalyst compounds of the invention as described above. Non-limiting activators, for example may include a Lewis acid or a non-coordinating ionic activator or ionizing activator or any other compounds including Lewis bases, aluminum alkyls, conventional-type cocatalysts (previously described herein) and combinations thereof that can convert a neutral bulky ligand metallocene-type catalyst compound to a catalytically active bulky ligand metallocene-type cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene-type catalyst compound. In one embodiment, an activation method using ionizing ionic compounds not containing an active proton but capable of producing both a bulky ligand metallocene-type catalyst cation and a noncoordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2, 2', 2''-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene-type catalyst compounds with perchlorates, periodates and iodates including their hydrates. WO 98/30602 and WO 98/30603 incorporated by reference describe the use of lithium (2,2'-bisphenyl-ditrimethylsilicate). 4THF as an activator for a bulky ligand metallocene-type catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene-type catalyst compound or precursor to a bulky ligand metallocene-type cation capable of polymerizing olefins. Other activators or methods for activating a bulky ligand metallocene-type catalyst compound are described in for example, U.S. Pat. Nos. 5,849,852, 5,859,653 and 5,869,723 and PCT WO 98/32775, which are herein incorporated by reference.

Mixed Catalysts

It is also within the scope of this invention that the above described bulky ligand metallocene-type catalyst compounds can be combined with one or more of the catalyst compounds represented by formula (I), (II), (III), (IV) and (V) with one or more activators or activation methods described above.

It is further contemplated by the invention that other catalysts can be combined with the bulky ligand metallocene-type catalyst compounds of the invention. For example, see U.S. Pat. Nos. 4,937,299, 4,935,474, 5,281,679, 5,359,015, 5,470,811, and 5,719,241 all of which are herein fully incorporated herein reference.

In another embodiment of the invention one or more bulky ligand metallocene-type catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090, all of which are herein incorporated by reference.

Method for Supporting

The above described bulky ligand metallocene-type catalyst compounds and catalyst systems and conventional-type transition metal catalyst compounds and catalyst systems may be combined with one or more support materials or carriers using one of the support methods well known in the art or as described below. In the preferred embodiment, the method of the invention uses a polymerization catalyst in a supported form. For example, in a most preferred embodiment, a bulky ligand metallocene-type catalyst compound or catalyst system is in a supported form, for example deposited on, contacted with, or incorporated within, adsorbed or absorbed in a support or carrier.

The terms "support" or "carrier" are used interchangeably and are any porous or non-porous support material, preferably a porous support material, for example, talc, inorganic oxides and inorganic chlorides. Other carriers include resinous support materials such as polystyrene, a functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports includes silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

It is preferred that the carrier, most preferably an inorganic oxide, has a surface area in the range of from about 10 to about 700 m2/g, pore volume in the range of from about 0.1 to about 4.0 cc/g and average particle size in the range of from about 10 to about 500 μm. More preferably, the surface area of the carrier is in the range of from about 50 to about 500 m2/g, pore volume of from about 0.5 to about 3.5 cc/g and average particle size of from about 20 to about 200 μm. Most preferably the surface area of the carrier is in the range of from about 100 to about 400 m2/g, pore volume from about 0.8 to about 3.0 cc/g and average particle size is from about 20 to about 100 μm. The average pore size of a carrier of the invention is typically in the range of from about 10 Å to 1000 Å, preferably 50 Å to about 500 Å, and most preferably 75 Å to about 350 Å.

Examples of supporting the bulky ligand metallocene-type catalyst systems of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032 and 5,770,664 and U.S. application Ser. Nos. 271,598 filed Jul. 7, 1994 and 788,736 filed Jan. 23, 1997 and PCT publications WO 95/32995, WO 95/14044, WO 96/06187 and WO 97/02297 all of which are herein fully incorporated by reference.

Examples of supporting the conventional-type catalyst systems of the invention are described in U.S. Pat. Nos. 4,894,424, 4,376,062, 4,395,359, 4,379,759, 4,405,495 4,540758 and 5,096,869, all of which are herein incorporated by reference.

It is contemplated that the bulky ligand metallocene-type catalyst compounds of the invention may be deposited on the same or separate supports together with an activator, or the activator may be used in an unsupported form, or may be deposited on a support different from the supported bulky ligand metallocene-type catalyst compounds of the invention, or any combination thereof.

There are various other methods in the art for supporting a polymerization catalyst compound or catalyst system of the invention. For example, the bulky ligand metallocene-type catalyst compound of the invention may contain a polymer bound ligand as described in U.S. Pat. Nos. 5,473,202 and 5,770,755, which is herein fully incorporated by reference; the bulky ligand metallocene-type catalyst system of the invention may be spray dried as described in U.S. Pat. No. 5,648,310, which is herein fully incorporated by reference; the support used with the bulky ligand metallocene-type catalyst system of the invention is functionalized as described in European publication EP-A-0 802 203, which is herein fully incorporated by reference; or at least one substituent or leaving group is selected as described in U.S. Pat. No. 5,688,880, which is herein fully incorporated by reference.

In a preferred embodiment, the invention provides for a supported bulky ligand metallocene-type catalyst system that includes a surface modifier that is used in the preparation of the supported catalyst system, as described in PCT publication WO 96/11960 which is herein fully incorporated by reference.

A preferred method for producing the supported bulky ligand metallocene-type catalyst system of the invention is described below and can be found in U.S. application Ser. Nos. 265,533, filed Jun. 24, 1994 and 265,532, filed Jun. 24, 1994 and PCT publications WO 96/00245 and WO 96/00243 both published Jan. 4, 1996, all of which are herein fully incorporated by reference. In this preferred method, the bulky ligand metallocene-type catalyst compound is slurried in a liquid to form a metallocene solution and a separate solution is formed containing an activator and a liquid. The liquid may be any compatible solvent or other liquid capable of forming a solution or the like with the bulky ligand metallocene-type catalyst compounds and/or activator of the invention. In the most preferred embodiment the liquid is a cyclic aliphatic or aromatic hydrocarbon, most preferably toluene. The bulky ligand metallocene-type catalyst compound and activator solutions are mixed together and added to a porous support or the porous support is added to the solutions such that the total volume of the bulky ligand metallocene-type catalyst compound solution and the activator solution or the bulky ligand metallocene-type catalyst compound and activator solution is less than five times the pore volume of the porous support, more preferably less than four times, even more preferably less than three times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, Experimental Methods in Catalytic Research (Academic Press, 1968) (specifically see pages 67-96). This preferred procedure involves the use of a classical BET apparatus for nitrogen absorption. Another method well known in the art is described in Innes, Total Porosity and Particle Density of Fluid Catalysts By Liquid Titration, Vol. 28, No. 3, Analytical Chemistry 332–334 (March, 1956).

The mole ratio of the metal of the activator component to the metal of the bulky ligand metallocene-type catalyst compounds are in the range of between 0.3:1 to 2000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the catalyst is preferably in the range of between 0.3:1 to 3:1.

In one embodiment of the invention, olefin(s), preferably C2 to C30 olefin(s) or α-olefin(s) preferably ethylene or propylene or combinations thereof are prepolymerized in the presence of the bulky ligand metallocene-type catalyst system and/or a conventional-type transition metal catalysts of the invention prior to the main polymerization. The prepolymerization can be earned out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference. A prepolymerized catalyst system for purposes of this patent specification and appended claim is a supported catalyst system.

Method of Preparing the Catalyst Composition

The method for making the catalyst composition generally involves the combining, contacting, blending, and/or mixing of a catalyst system or polymerization catalyst with a static charge modifier.

In one embodiment of the method of the invention, a conventional-type transition metal catalyst and/or a bulky ligand metallocene-type catalyst is combined, contacted, blended, and/or mixed with at least one static charge modifier. In a most preferred embodiment, the conventional-type transition metal catalyst and/or the bulky ligand metallocene-type catalyst are supported on a carrier.

In another embodiment, the steps of the method of the invention include forming a polymerization catalyst, preferably forming a supported polymerization catalyst, and contacting the polymerization catalyst with at least one static charge modifier. In a preferred method, the polymerization catalyst comprises a catalyst compound, an activator or cocatalyst and a carrier, preferably the polymerization catalyst is a supported bulky ligand metallocene-type catalyst.

One in the art recognizes that depending on the catalyst system and the static charge modifier used certain conditions of temperature and pressure would be required to prevent, for example, a loss in the activity of the catalyst system.

In one embodiment of the method of the invention the static charge modifier is contacted with the catalyst system, preferably a supported catalyst system, most preferably a supported bulky ligand metallocene-type catalyst system under ambient temperatures and pressures. Preferably the contact temperature for combining the polymerization catalyst and the static charge modifier is in the range of from 0° C. to about 100° C., more preferably from 15° C. to about 75° C., most preferably at about ambient temperature and pressure.

In a preferred embodiment, the contacting of the polymerization catalyst and the static charge modifier is performed under an inert gaseous atmosphere, such as nitrogen. However, it is contemplated that the combination of the polymerization catalyst and the static charge modifier may be performed in the presence of olefin(s), solvents, hydrogen and the like.

In one embodiment, the static charge modifier may be added at any stage during the preparation of the polymerization catalyst.

In one embodiment of the method of the invention, the polymerization catalyst and the static charge modifier are combined in the presence of a liquid, for example the liquid may be a mineral oil, toluene, hexane, isobutane or a mixture thereof. In a more preferred method the static charge modifier is combined with a polymerization catalyst that has been formed in a liquid, preferably in a slurry, or combined with a substantially dry or dried, polymerization catalyst that has been placed in a liquid and reslurried.

In an embodiment, the contact time for the static charge modifier and the polymerization catalyst may vary depending on one or more of the conditions, temperature and pressure, the type of mixing apparatus, the quantities of the components to be combined, and even the mechanism for introducing the polymerization catalyst/static charge modifier combination into the reactor.

Preferably, the polymerization catalyst, preferably a bulky ligand metallocene-type catalyst compound and a carrier, is contacted with a static charge modifier for a period of time from about a second to about 24 hours, preferably from about 1 minute to about 12 hours, more preferably from about 10 minutes to about 10 hours, and most preferably from about 30 minutes to about 8 hours.

In an embodiment, the ratio of the weight of the static charge modifier to the weight of the transition metal of the catalyst compound is in the range of from about 0.01 to about 1000, preferably in the range of from 1 to about 100, more preferably in the range of from about 2 to about 50, and most preferably in the range of from 4 to about 20. In one embodiment, the ratio of the weight of the static charge modifier to the weight of the transition metal of the catalyst compound is in the range of from about 2 to about 20, more preferably in the range of from about 2 to about 12, and most preferably in the range of from 4 to about 10.

In another embodiment of the method of the invention, the weight percent of the static charge modifier based on the total weight of the polymerization catalyst is in the range of from about 0.5 weight percent to about 500 weight percent, preferably in the range of from 1 weight percent to about 25 weight percent, more preferably in the range of from about 2 weight percent to about 12 weight percent, and most preferably in the range of from about 2 weight percent to about 10 weight percent. In another embodiment, the weight percent of the static charge modifier based on the total weight of the polymerization catalyst is in the range of from 1 to about 50 weight percent, preferably in the range of from 2 weight percent to about 30 weight percent, and most preferably in the range of from about 2 weight percent to about 20 weight percent.

In one embodiment, where the process of the invention is producing a polymer product having a density greater than 0.910 g/cc, the total weight percent of the static charge modifier based on the total weight of the polymerization catalyst is greater than 1 weight percent. In yet another embodiment, where the process of the invention is producing a polymer product having a density less than 0.910 g/cc, the total weight percent of the static charge modifier based on the total weight of the polymerization catalyst is greater than 3 weight percent. If the polymerization catalyst includes a carrier, the total weight of the polymerization catalyst includes the weight of the carrier.

It is believed that the more metal of the activator, for example total aluminum content or free aluminum content (the alkyl aluminum content in alumoxane), present in the polymerization catalyst, the more static charge modifier is required. Manipulating the amounts or loadings of the polymerization catalyst components, i.e. the free aluminum may provide a means for adjusting the level of static charge modifier.

Mixing techniques and equipment contemplated for use in the method of the invention are well known. Mixing techniques may involve any mechanical mixing means, for example shaking, stirring, tumbling, and rolling. Another technique contemplated involves the use of fluidization, for example in a fluid bed reactor vessel where circulated gases provide the mixing. Non-limiting examples of mixing equipment for combining, in the most preferred embodiment a solid polymerization catalyst and a solid static charge modifier, include a ribbon blender, a static mixer, a double cone blender, a drum tumbler, a drum roller, a dehydrator, a fluidized bed, a helical mixer and a conical screw mixer.

In an embodiment of the method of the invention, a supported conventional-type transition metal catalyst, preferably a supported bulky ligand metallocene-type catalyst, is tumbled with a static charge modifier for a period of time such that a substantial portion of the supported catalyst is intimately mixed and/or substantially contacted with the static charge modifier.

In a preferred embodiment of the invention the catalyst system of the invention is supported on a carrier, preferably the supported catalyst system is substantially dried, preformed, substantially dry and/or free flowing. In an especially preferred method of the invention, the preformed supported catalyst system is contacted with at least one static charge modifier. The static charge modifier may be in solution or slurry or in a dry state, preferably the static charge modifier is in a substantially dry or dried state. In the most preferred embodiment, the static charge modifier is contacted with a supported catalyst system, preferably a supported bulky ligand metallocene-type catalyst system in a rotary mixer under a nitrogen atmosphere, most preferably the mixer is a tumble mixer, or in a fluidized bed mixing process, in which the polymerization catalyst and the static charge modifier are in a solid state, that is they are both substantially in a dry state or in a dried state.

In an embodiment of the method of the invention a conventional-type transition metal catalyst compound, preferably a bulky ligand metallocene-type catalyst compound, is contacted with a carrier to form a supported catalyst compound. In this method, an activator or a cocatalyst for the catalyst compound is contacted with a separate carrier to form a supported activator or supported cocatalyst. It is contemplated in this particular embodiment of the invention, that a static charge modifier is then mixed with the supported catalyst compound or the supported activator or cocatalyst, in any order, separately mixed, simultaneously mixed, or mixed with only one of the supported catalyst, or preferably the supported activator prior to mixing the separately supported catalyst and activator or cocatalyst.

As a result of using the combination of polymerization catalyst/static charge modifier of the invention it may be necessary to improve the overall catalyst flow into the reactor. Despite the fact that the catalyst flow is not as good as a catalyst without the static charge modifier, the flowability of the catalyst/carboxylate combination of the invention was not a problem. If catalyst flow needs improvement, it is well known in the art to use bin vibrators, or catalyst feeder brushes and feeder pressure purges and the like.

In another embodiment, the polymerization catalyst/static charge modifier may be contacted with a liquid, such as mineral oil and introduced to a polymerization process in a slurry state. In this particular embodiment, it is preferred that the polymerization catalyst is a supported polymerization catalyst.

In some polymerization processes smaller particle size support materials are preferred. However, the operability of these processes is more challenging. It has been discovered that utilizing the polymerization catalyst and static charge modifier combination of the invention, smaller particle size support materials may be used successfully. For example, silica having an average particle size from about 10 microns to 80 microns. Silica materials of this size are available from Crosfield Limited, Warrington, England, for example Crosfield ES-70 having an average particle size of 35 to 40 microns. Not wishing to bound by any theory, it is traditionally believed that using smaller average particle size supports produces more fines and results in a more sheeting prone supported catalyst. It is also believed that the use of a static charge modifier with the polymerization catalyst provides for better particle growth during polymerization. This better particle morphology is believed to result in fewer fines and a reduced tendency for sheeting to occur. Thus, the use of a static charge modifier allows for the use of a smaller support material.

In an embodiment, the method of the invention provides for co-injecting an unsupported polymerization catalyst and a static charge modifier into the reactor. In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with a static charge modifier to a reactor using the injection methods described in PCT publication WO 97/46599, which is fully incorporated herein by reference.

Where a static charge modifier and an unsupported bulky ligand metallocene-type catalyst system combination is utilized, the mole ratio of the metal of the activator component to the metal of the bulky ligand metallocene-type catalyst compound is in the range of between 0.3:1 to 10,000:1, preferably 100:1 to 5000:1, and most preferably 500:1 to 2000:1.

Polymerization Process

The catalysts and catalyst systems of the invention described above are suitable for use in any polymerization process. Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, vinylbenzocyclobutane, styrenes, alkyl substituted styrene, ethylidene norbornene, isoprene, dicyclopentadiene and cyclopentene.

In the most preferred embodiment of the process of the invention, a copolymer of ethylene is produced, where with ethylene, a comonomer having at least one α-olefin(s) having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a process, particularly a gas phase or slurry phase process, for polymerizing propylene alone or with one or more other monomers including ethylene, and olefins having from 4 to 12 carbon atoms. Polypropylene polymers may be produced using particularly bridged bulky ligand metallocene-type catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.) The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in the gas phase process may vary from about 30° C. to about 120° C., preferably from about 60° C. to about 115° C., more preferably in the range of from about 70° C. to 110C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202, EP-A2 0 891 990 and EP-B-634 421 all of which are herein fully incorporated by reference.

In a preferred embodiment, the reactor utilized in the present invention is capable and the process of the invention is producing greater than 500 lbs of polymer per hour (227 kg/hr) to about 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 kg/hr) and most preferably greater than 65,000 lbs/hr (29,000 kg/hr) to greater than 100,000 lbs/hr (45,500 kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process of the invention is producing greater than 15,000 lbs of polymer per hour (6804 kg/hr), preferably greater than 25,000 lbs/hr (11,340 kg/hr) to about 100,000 lbs/hr (45,500 kg/hr).

Examples of solution processes are described in U.S. Pat. Nos. 4,271,060, 5,001,205, 5,236,998 and 5,589,555, which are fully incorporated herein by reference.

A preferred process of the invention is where the process, preferably a slurry or gas phase process is operated in the presence of a bulky ligand metallocene-type catalyst system and in the absence of or essentially free of any scavengers, such as triethylaluminum, trimethylaluminum, triisobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543 which are herein fully incorporated by reference. However, it has been discovered that a polymerization process utilizing the catalyst system/static charge modifier combination of the invention may be operated with a small amount of scavenger with reduced or no effect on process operability and catalyst performance. Thus, in one embodiment, the invention provides a process for polymerizing olefin(s) in a reactor in the presence of a bulky ligand metallocene-type catalyst system, a static charge modifier and a scavenger.

In one embodiment, the polymerization catalyst and/or catalyst composition, the polymerization catalyst and the static charge modifier have a productivity greater than 1500 grams of polymer per gram of catalyst, preferably greater than 2000 grams of polymer per gram of catalyst, more preferably greater than 2500 grams of polymer per gram of catalyst and most preferably greater than 3000 grams of polymer per gram of catalyst.

In another embodiment, the polymerization catalyst and/or catalyst composition, the polymerization catalyst and the static charge modifier, have a productivity greater than 2000 grams of polymer per gram of catalyst, preferably greater than 3000 grams of polymer per gram of catalyst, more preferably greater than 4000 grams of polymer per gram of catalyst and most preferably greater than 5000 grams of polymer per gram of catalyst.

In one embodiment, the polymerization catalyst and/or the catalyst composition has a reactivity ratio generally less than 2, more typically less than 1. Reactivity ratio is defined to be the mole ratio of comonomer to monomer entering the reactor, for example as measured in the gas composition in a gas phase process, divided by the mole ratio of the comonomer to monomer an the polymer product being produced. In a preferred embodiment, the reactivity ratio is less than 0.6, more preferably less than 0.4 and most preferably less than 0.3. In the most preferred embodiment, the monomer is ethylene and the comonomer is an olefin having 3 or more carbon atoms, more preferably an α-olefins(s) having 4 or more carbon atoms, and most preferably an α-olefin(s) selected front the group consisting of butene-1, 4-methyl-pentene-1 -pentene-1, hexene-1 and octene-1.

In another embodiment of the invention, when transitioning from a first polymerization catalyst to a second polymerization catalyst, preferably where the first and second polymerization catalysts are bulky ligand metallocene-type catalyst compound, more preferably where the second polymerization catalyst is a bridged, bulky ligand metallocene-type catalyst compound, it would be preferable during the transition to use a catalyst composition of a static charge modifier combined with a bridged, bulky ligand metallocene-type catalyst.

When starting up a polymerization process, especially a gas phase process, there is a higher tendency for operability problems to occur. Thus, it is contemplated in the present invention that a polymerization catalyst and static charge modifier mixture is used on start-up to reduce or eliminate start-up problems. Furthermore, it also contemplated that once the reactor is operating in a stable state, a transition to the same or a different polymerization catalyst without the static charge modifier can be made.

In another embodiment, during a polymerization process that is or is about to be disrupted, a polymerization catalyst/static charge modifier mixture of the invention could be transitioned to. This switching of polymerization catalysts is contemplated to occur when operability problems arise. Indications of operability problems are well known in the art. Some of which in a gas phase process include temperature excursions in the reactor, unexpected pressure changes, excessive static generation or unusually high static spikes, chunking, sheeting and the like. In an embodiment, the static charge modifier may be added directly to the reactor, particularly when operability problems arise.

It has also been discovered that using the polymerization catalyst combined with a static charge modifier of the invention it is easier to produce fractional melt index and higher density polymers. In one embodiment, the invention provides for a process for polymerizing olefin(s) in a reactor in the presence of a polymerization catalyst in combination with a static charge modifier to produce a polymer product having a melt index less than about 1 dg/min and a density greater than 0.920 g/cc, more preferably the polymer product has a melt index less than about 0.75 dg/min and a density greater than 0.925 g/cc. Preferably the polymerization catalyst is a bulky ligand metallocene-type catalyst, more preferably the process is a gas phase process and the polymerization catalyst includes a carrier.

It is contemplated that using the combination polymerization catalyst/static charge modifier of the invention, transitioning to one of the more difficult grades of polymers would be simpler. Thus, in one embodiment, the invention is directed to a process for polymerizing olefin(s) in the presence of a first catalyst composition, under steady state conditions, preferably gas phase process conditions, to produce a first polymer product. The first polymer product having a density greater than 0.87 g/cc, preferably greater than 0.900 g/cc, more preferably greater than 0.910 g/cc, and a melt index in the range of from 1 dg/min to about 200 dg/min, preferably in the range of greater than 1 dg/min to about 100 dg/min, more preferably from greater than 1 dg/min to about 50 dg/min, most preferably from greater than 1 dg/min to about 20 dg/min. This process further comprises the step of transitioning to a second catalyst composition to produce second polymer product having a density greater than 0.920 g/cc, preferably greater than 0.925 g/cc, and a melt index less than 1 dg/min, preferably less than 0.75 dg/min. The second catalyst composition comprising, in combination, a conventional-type transition metal catalyst and/or a bulky ligand metallocene-type catalyst, and a static charge modifier. It is also within the scope of this particular embodiment to transition from a first polymer product having an I21/I2 (described below) of less than 25 to a second polymer product having an I21/I2 greater than 25, preferably greater than 30, and even more preferably greater than 35.

In yet another embodiment, the process of the invention involves alternating between a first catalyst composition comprising a first polymerization catalyst/static charge modifier mixture and a catalyst composition of a second polymerization catalyst without a static charge modifier to improve the overall process operability. In a further embodiment, the first and second catalyst compositions described above can be used simultaneously, for example as a mixture or injected into a reactor separately. In any of these embodiment, the first and second polymerization catalysts may be the same or different.

Alternative Method of Using Static Charge Modulators

In addition to being added to the catalyst system, it has been found that the static charge modifiers of the present invention can be used to control static charges by being introduced directly into the reaction medium. In this method they can be used in the same manner as conventional static control agents.

For example, the static charge modifiers can be dissolved in a suitable solvent and introduced into the reactor in an inert or nonreactive atmosphere. One preferred inert atmosphere is nitrogen.

The static charge modifiers can be introduced into the reactor by injecting the modifier directly into the fluidized bed or by adding the modifier to the gas stream before it enters the reactor

EXAMPLES

The following examples are illustrative of the practice of the present invention.

Example 1

Synthesis of [N(C18H37)4] [B(C6H5)4]

Starting Materials:

65.17 g [(n-C18H37)4N]Br+51.25 g LiB(C6F5)4 (Et2O)2.5

[(n-C18H37)4N]BrMW1107.9

LiB(C6F5)4 (Et2O)2.5 MW871.3

In dry box, 65.17 g of [(n-C18H37)4N]Br and 51.25 g of LiB(C6F5)4 (Et2O)2.5 were added into a flask. 300 mL. methylene chloride was added and the mixture was stirred for 1.5 hrs. Most of solvent may be removed by assisted evaporation with dry nitrogen. Approximately 400–500 mL. pentane is added. The resulting mixture is filtered through Celite until the filtrate is clear. This is then filtered through a 0.45 micron filter. The pentane is removed by assisted evaporation, followed by drying of the white solid product [N(C18H37)4] [B(C6H5)4] (hereinafter, AB-1) under vacuum. The product may be characterized by 1H and 19F-NMR.

The tetraalkylammonium borate salt [N(C18H37)4] [B(C6H5)4] (AB-1) used in this study was already under evaluation as a modifier or adjuvant molecule in solution polymerizations. The salts used here were prepared and their purity verified by proton and fluorine NMR. AB-1 was additionally characterized by Differential Scanning Calorimetry ("DSC"). It has a sharp melting point at 54.5° C. ($\Delta$Hm=90.7 J/g). The salt was heated to 300° C. at 10° C./min and then cooled again to ambient temperature to judge thermal stability of the salt.

Example 2

Preparation of Catalyst With the Tetrakis (Octadecyl) Ammonium Tetrakis (penta-fluoro-phenyl) Boron Static Charge Modifier In a dry box purged with dry nitrogen, two one-liter bottles were charged with 29.93g and 29.92g of tetrakis (octadecyl) ammonium tetrakis (penta-fluoro-phenyl) boron described above. To each bottle, 900 mL. of dried hexane was added. The bottles were sealed and removed from the dry box.

The solutions were then cantered onto 1.75 kg of dry, silica supported dimethylsilyl (tetrahydroindenyl) zirconium dichloride and alumoxane in a sealed glass reactor equipped with a stirrer. An additional 700 mL. of dry hexane was added to form a paste-like slurry. This was gently stirred and dried under nitrogen purge at 100° F. (3° C.) for approximately 5 hours. The dried catalyst weighed 1.8 kg. The boron/zirconium stoichiometry was 0.95.

The catalyst then prepared was used in the polymerization reported in Example 3.

Example 3

Fluid-Bed Polymerization

The polymerization was conducted in a continuous gas phase fluidized bed reactor. The fluidized bed is made up of polymer granules. The gaseous feed streams of ethylene and hydrogen together with liquid comonomer were mixed together in a mixing tee arrangement and introduced below the reactor bed into the recycle gas line. Hexene was used as comonomers. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen to ethylene mole ratio. The concentration of all the gases were measured by an on-line gas chromatograph to ensure relatively constant composition in the recycle gas stream.

The solid catalyst was injected directly into the fluidized bed using purified nitrogen as a carrier. Its rate was adjusted to maintain a constant production rate. The reacting bed of growing polymer particles is maintained in a fluidized state by the continuous flow of the make up feed and recycle gas through the reaction zone. A superficial gas velocity of 1–3 ft/sec was used to achieve this. The reactor was operated at a total pressure of 300 psig. To maintain a constant reactor temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product is removed semi-continuously via a series of valves into a fixed volume chamber, which is simultaneously vented back to the reactor. This allows for highly efficient removal of the product, while at the same time recycling a large portion of the unreacted gases back to the reactor. This product is purged to remove entrained hydrocarbons and treated with a small steam of humidified nitrogen to deactivate any trace quantities of residual catalyst.

The properties of the polymer was determined by the following test methods:

Melt Index: ASTM D-1238—Condition E

Density: ASTM D-105

Bulk Density: The resin is poured via a ⅞" diameter funnel into a fixed volume cylinder of 400 cc. The bulk density is measured as the weight of resin divided by 400 cc to give a value in g/cc.

Particle Size: The particle size is measured by determining the weight of material collected on a series of U.S. Standard sieves and determining the weight average particle size based on the sieve series used.

The fines are defined as the percentage of the total distribution passing through a 120 mesh standard sieve. This has a particle size equivalent of 120 microns. Fines are important since high levels can lead to sheeting and fouling of the reaction cycle gas system. This results in heat exchanger distributor plate fouling requiring a reactor shut down to clean out.

Temperatures which exist at the wall of the reactor are indicative of potential reactor operating problems. The temperature can be measured using any appropriate device but in general thermocouples are the most common. Since the temperature being measured is close to the reactor wall or "skin" they are referred to as skin thermocouples. Typically, the skin thermocouples are 5–10° F. below the internal bed temperature. Deviations from the baseline are indicative of reactor operability problems. These deviations can be either positive or negative.

Positive skin thermocouple deviations are indicative of reactor sheeting due to the formation of a run away reaction at the wall of the reactor. As the temperature continues to increase, it reaches the melting point of the polymer at which point a solid strip of polymer is formed and dislodged to the main body of the reactor. This results in sever operability problems since mixing and removal of the product is negatively impacted. In many cases, a reactor shut down is required to remove the sheets requiring several hours to days to remove and re-start.

Negative skin thermocouple deviations are less serious since this is representative of cold polymer being situated at the wall of the reactor. However, this can present a problem if it persists since a solid insulating layer is formed. If this layer continues to grow, it can quickly transform into a reactor sheet if any minor upsets occur. This phenomenon is referred to as "cold bands". It is found that the cold bands are often associated with the adherence of small polymer particles or "fines" to the wall of the reactor. The reactor was equipped with 7 internal skin thermocouples. These thermocouples extend 0.125–0.250 inches from the wall of the reactor. These were monitored continuously using a Honeywell TDC 3000 process computer.

In addition, the reactor was equipped with three static probes. These probes are based on sensing of the static charge in the reactor using flow of current to the ground. Any one of several instruments can be used for this purpose including electrometers, ammeters and similar devices. In this work, a device called the Correflow Electrostatic Monitor (ESM) manufactured by Auburn International (now owned by Oxford Instruments plc) was used. This unit contains both a catalyst flow and entrainment or carryover probe.

Figure 1:
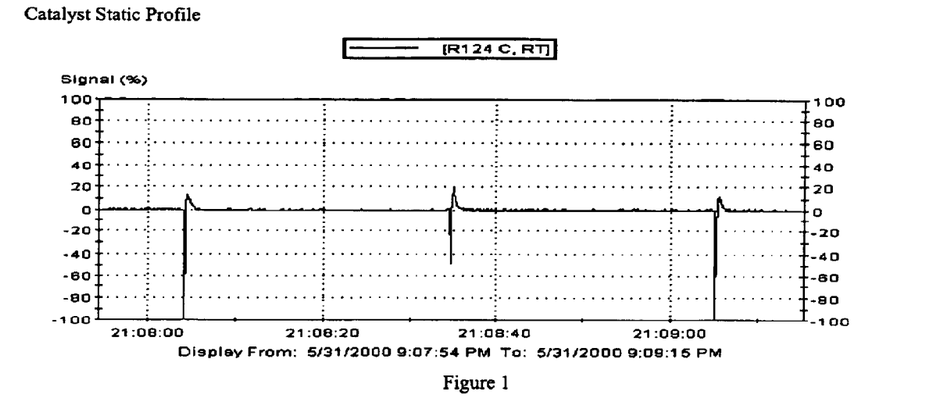
FIGS. 1 and 2 are plots of measured static levels in a reactor performing polymerizations utilizing bulky ligand metallocene-type catalyst systems with and without static charge modifiers.
Figure 2:
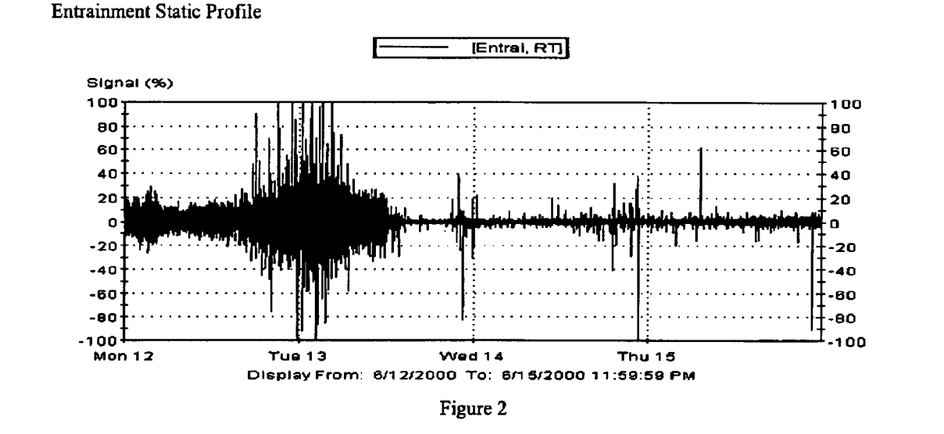

Typical output signals for the catalyst static profile and entrainment static profile are shown in FIGS. 1 and 2.

Experimental Results

Catalyst Activity

Control

The reactor was at steady state using the EX-381 catalyst producing a 3.0 melt index and 0.920 density hexene copolymer. Run conditions were as follows:

| Run Conditions | |
|---|---|
| Catalyst | EX-381 |
| Zr (wt %) | 0.35 |
| Temperature (° C.) | 85 |
| Pressure (bar) | 21.7 |
| Ethylene (mole %) | 70.0 |
| Hydrogen (mole ppm) | 296 |
| Hexene | 1.10 |
| Bed Weight (Kg) | 250 |
| Production Rate (kg/hr) | 65.5 |
| Catalyst Productivity (kg/kg) | 3570 |
| Bulk Density (g/cc) | 0.40 |
| Average Particle Size (microns) | 936 |
| Fines (% less than 120 microns) | 0.23 |

Boron Salt Catalyst

The reactor was at steady state using the EX-380 catalyst termed bare catalyst since it did not contain any aluminum di-stearate. Catalyst not containing the aluminum di-sterate is prone to sheeting. The boron salt was added to this catalyst at a 1.24:1 ratio of boron to zirconium. It was used to produce a 8.2 melt index and 0.9174 density hexene copolymer. Run conditions were as follows:

| Run Conditions | |
|---|---|
| Catalyst | EX-380 |
| Zr (wt %) | 0.28 |
| Temperature (° C.) | 85 |
| Pressure (bar) | 21.7 |
| Ethylene (mole %) | 70.0 |
| Hydrogen (mole ppm) | 231 |
| Hexene | 0.66 |
| Bed Weight (Kg) | 280 |
| Production Rate (kg/hr) | 44.5 |
| Catalyst Productivity (kg/kg) | 4700 |
| Bulk Density (g/cc) | 0.47 |
| Average Particle Size (microns) | 790 |
| Fines (% less than 120 microns) | 0.36 |

Reactor Continuity

Control

The catalyst pulse was very large and had a sharp negative pulse followed by a shorter positive pulse indicating high charge on the catalyst. The overhead or entrainment signal was a broad signal centered on zero indicating the presence of large quantities of both positive and negatively charged particles. Visual observations of the expanded section dome through a high pressure sight glass 10 showed a uniform and thick coating approximately ¼–½ inch thick. The catalyst pulse had an initial spike to –5000 pA followed by positive pulse to 2000 pA. The corresponding overhead entrainment signal varied from +1000 to –1000 pA.

Boron Salt

In this instance the catalyst pulse was much reduced in both size and duration. Only a single small spike to 500 pA was observed representing complete elimination of the negative charge and a 75% reduction of the positive charge. The entrainment signal was sharply reduced to +20 pA to –20 pA, a 98% reduction in the charge on the overhead carryover. At the same time the dome area coating disappeared so that the bare, grey metal of the reactor was observed when viewed through the sight glass.

Conclusions

The addition of a static charge modifier salt of the present invention gas phase olefin polymerization reactions using metallocene catalyst reduces static charge build-up in the reactor. The modifiers allow flexibility as per the means of their incorporation into the catalyst

REFERENCES

The following references, to the extent that they provide exemplary procedural or other details supplementary to those set forth herein, are specifically incorporated herein by reference.

Gassman, Sowa, Jr., Hill, Mann, Organometallics, 1995, 14, 4879–4885.

We claim:

1. A catalyst composition comprising, in combination, a polymerization catalyst comprising metallocene catalyst static charge modifier having the formula [C]+[A]− wherein the cation [C]+ does not possess an active hydrogen or other reactive group and [A]− is a weakly conducting metal or metalloid containing anion, and wherein the polymerization catalyst and the static charge modifier are in a solid state.

2. The catalyst composition of claim 1 wherein the cation [C]+ satisfies the formula [DR1 ... Rn] wherein D is an atom having a permanent charge, selected from Group 15 of the Periodic Table and each R is independently an aliphatic or aromatic hydrocarbyl and n is the number of substitutions required to exhaust the ability of D to form additional chemical bonds.

3. The catalyst composition of claim 1 wherein [A]– has the chemical formula [ER'1 ... R'm]– wherein E is a metal or metalloid and each R' is, independently, hydride radicals, bridged or imbridged dialkylamido radicals, alkoxide and aryloxide radicals, hydrocarbyl and substituted hydrocarbyl radicals, and hydrocarbyl and halohydrocarbyl substituted organometalloid radicals and m is an integer equal to the valence state of E+'.

4. The catalyst composition of claim 3 wherein said metalloid is boron.

5. The catalyst composition of claim 1 wherein said static charge modifier is selected from the group consisting of:
[N(C5H11)4][B(C6F5)4], [P(C4H9)4[B(C6F5)4], [N(C4H9)4][B(C6F5)4], [N(C18H37)4[B(C6F5)4], [P(C6H5)4][B(C6F5)4], and [N(C18H37)2(CH3)2][B(C6F5)4].

6. The catalyst composition of claim 1 wherein said polymerization catalyst further comprises a carrier.

7. The catalyst composition of claim 6 wherein said carrier is an inorganic oxide carrier.

8. The catalyst composition of claim 1 further comprising a carrier and an activator.

9. The catalyst composition of claim 8 wherein said activator is alumoxane.

10. The catalyst composition of claim 1 wherein said static charge modifier is present in an amount ranging from 5 to 500 weight percent based on total polymerization catalyst weight.

* * * * *